Jan. 22, 1929.  E. W. LITTLE  1,699,899
HEAT DEFLECTOR
Filed Nov. 12, 1926   2 Sheets-Sheet 1
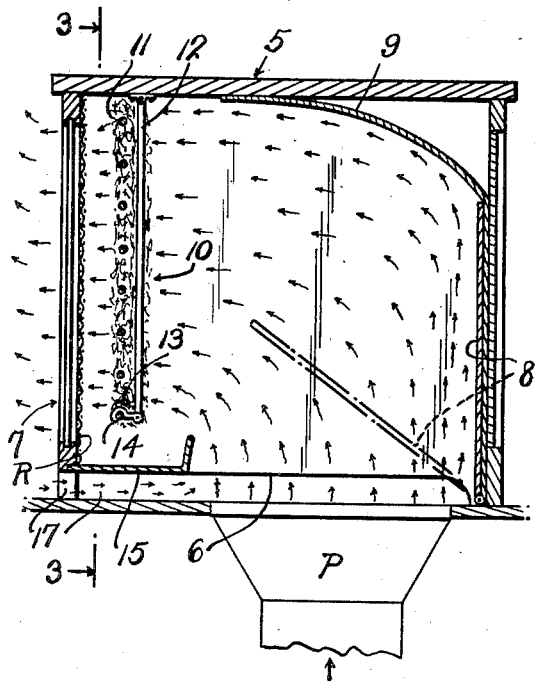
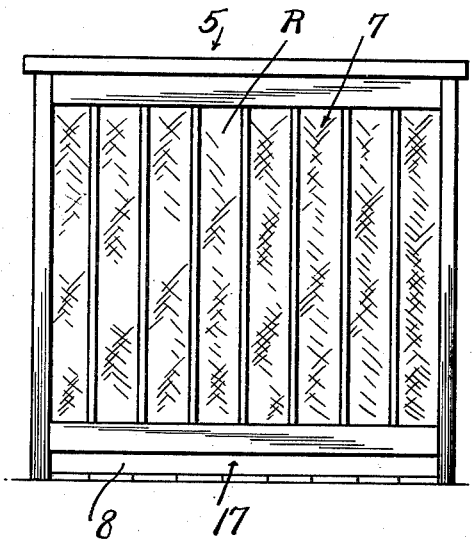
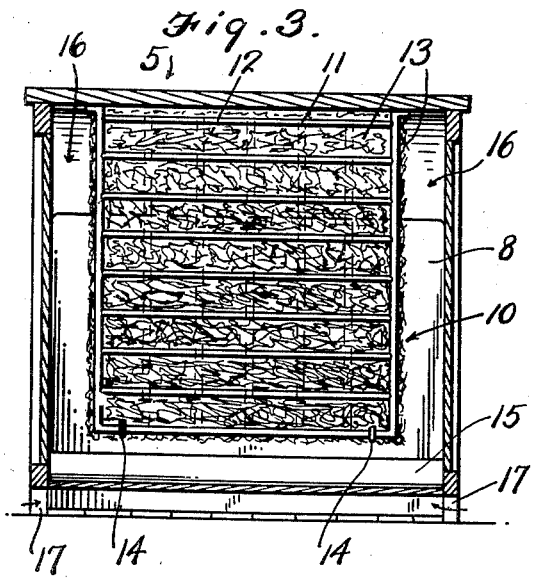
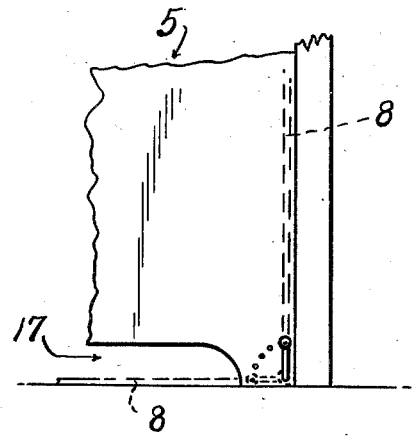
INVENTOR.
Earl W. Little
BY
L. B. James
ATTORNEY.

Jan. 22, 1929.  E. W. LITTLE  1,699,899
HEAT DEFLECTOR
Filed Nov. 12, 1926   2 Sheets-Sheet 2

INVENTOR.
Earl W. Little
BY C. B. James
ATTORNEY.

Patented Jan. 22, 1929.

1,699,899

UNITED STATES PATENT OFFICE.

EARL W. LITTLE, OF INDIANAPOLIS, INDIANA.

HEAT DEFLECTOR.

Application filed November 12, 1926. Serial No. 148,023.

This invention relates to deflectors and more particularly to a heat filtering deflector.

The primary object of this invention resides in the provision of a heat deflector associated with a filtering unit for purifying air emitted from heat distributing units of building heating systems prior to being discharged into the rooms.

Another object of this invention resides in the provision of a heat deflector having an air filter retainer adapted to removably retain the air filter thereof in the path of heat passing through the deflector.

A further object of this invention resides in the provision of a heat deflector having an air filter which is constructed of air penetrating material preferably formed in sheets.

A still further object of this invention resides in the provision of a heat deflector having an air filter formed of steel wool coated with fibrous asbestos so as to permit air to pass therethrough.

In addition to the foregoing objects, this invention resides in the provision of a heat deflector embodying an air filter associated with the deflector so as to deflect soot coming in contact therewith into a catch basin.

Aside from the aforesaid objects, this invention resides in the provision of a heat deflector having an air filter which is associated with an adjustable baffle plate adapted to be utilized to cover the heat register or other similar unit heating systems when it is desired to shut off the heat.

Among the many objects of this invention is the provision of the particularly constructed filter elements, the same being associated with the deflector to not only filter air passing through the material supported thereby, but to permit the natural flow of heat from the heat distributing unit with which it is associated should the filter become clogged.

Included among the salient features of this invention is the provision of an air filter adapted to present fibrous material in the path of air to be filtered, the same protruding from fins so as to permit air to pass therethrough and foreign matter to be checked thereby for deposit on the fins.

With these and other objects in view, this invention resides in certain novel features of construction, arrangement and combination of elements to be hereinafter set forth in the specification, illustrated in the accompanying drawings and pointed out in the appended claims and, while the disclosure depicts my present conception of the invention, the right is reserved to make such changes in the construction as come within the scope of the claims.

In the accompanying drawings:

Fig. 1 is a sectional view through a heat deflector constructed in accordance with my invention;

Fig. 2 is a front view thereof;

Fig. 3 is a sectional view on line 3—3 of Fig. 1;

Fig. 4 is a detail view of the baffle adjusting elements;

Figure 5:
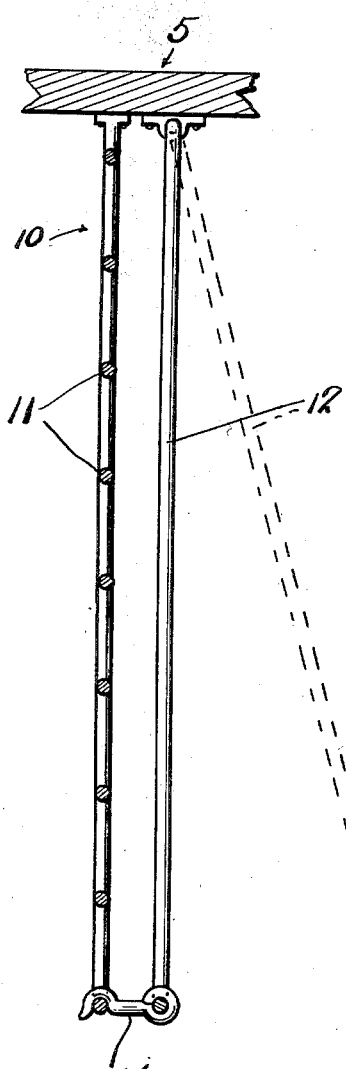
Fig. 5 is a detail view, on an enlarged scale, of filter retaining elements.
Figure 6:
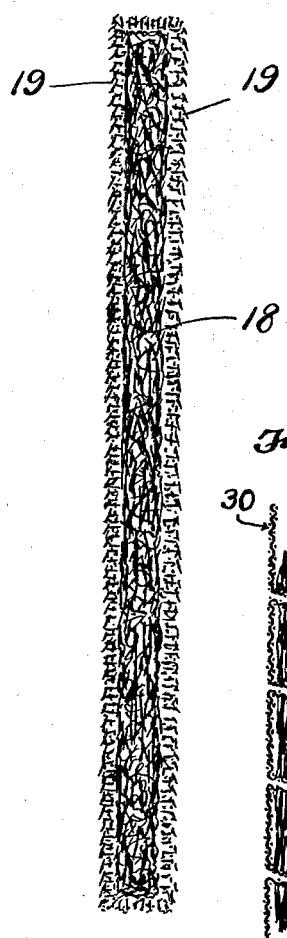
Fig. 6 is a detail view of one of the filter elements.

In the present embodiment of this invention, the letter P designates a floor register of a building heating plant, not shown, and while this type of heat emitting unit is herewith shown, the deflector is adapted to be associated with any type of heat emitting unit of building heating systems or heat discharging devices.

Associated with the register P is a heat deflector 5 preferably having an inlet port 6 and outlet port 7, the former of which has an adjusting baffle 8 associated therewith for either directing the flow of heat, entering the port 6, toward the outlet port 7 in various volumes, or to seal the inlet port 7 so as to entirely prevent heat from entering the deflector.

Associated with the inlet and outlet ports of the deflector is a stationary deflector plate 9 adapted to direct heat toward the latter port.

Covering the outlet port 7 is a sheet of reticulated material R of fine mesh adapted to conceal the interior of the deflector and prevent soot or other foreign material in the heated air from passing into the building should it escape a filter 10 disposed to its rear and within the deflector.

The aforesaid filter 10 preferably consists of forwardly and rearwardly disposed grates 11 and 12, the former of which preferably consists of horizontal bars rigidly fixed to the deflector while the latter consists of vertically disposed bars spaced from the horizontally disposed bars in hinged relation therewith, so as to removably accommodate a sheet of filtering material 13. The vertically and horizontally disposed bars, after the filtering material has been placed therebetween, are locked together by suitable fastening elements 14.

Beneath the filter 10 a catch basin 15 of any suitable construction is disposed, the same being adapted to catch foreign matter separated from the heated air by the filter.

The aforesaid filter is disposed within the deflector in spaced relation to certain walls thereof as shown at 16, so as to permit air to pass around the filter and maintain its initial velocity, especially should the filter become clogged by an excess accumulation of foreign matter.

To facilitate continuous circulation and purification of the air in a room, the deflector is provided with air inlet ports 17, the same preferably being disposed at the base of its front and side walls, although they may be otherwise associated with the components of the deflector where alterations of the deflector are necessary to associate it with different types of heat distributing units.

The filtering material 13 is preferably formed in sheets comprising a suitable grade of steel wool 18 coated with asbestos fibers 19, the same being fixed on the surfaces of the steel wool by any suitable adhesive so as to permit air to readily pass therethrough.

Figure 8:
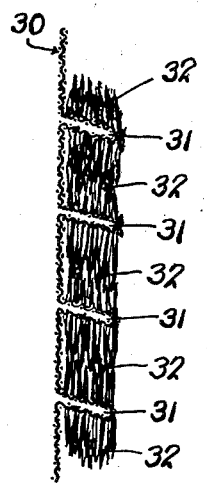
Fig. 8 is a vertical sectional view on line 8—8 of Fig 7.
Figures 7, 9:
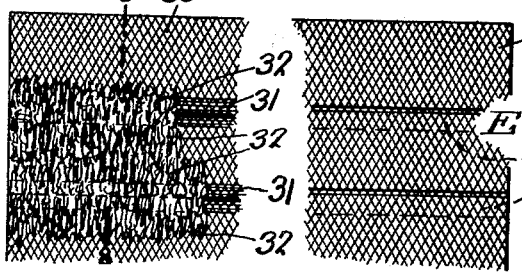
Fig. 7 is a rear view of a modified form of air filter.
Fig. 9 is a front view of the filter.

In the modified form of filter shown in Figs. 7 to 9 inclusive, a sheet of reticulated or other suitable material 30 is shown as being provided with or bent to form downwardly inclined fins 31 which are presented inwardly from the exit of the deflector. Said fins are adapted to carry fibrous asbestos 32 or other suitable material in protruding relation thereto, so as to permit air to readily pass through the same and allow foreign matter, such as soot or the like, to fall on the fins. With the fins 31 projecting downwardly from the sheet of material 30 and supporting the asbestos therebetween as aforesaid, the foreign matter checked by the asbestos will not bank against the surface of the sheet 30, therefore free passage of the filtered air is permitted through the sheet as its surface is not covered with filtering material.

With this invention fully set forth, it is manifest that a heat deflector is provided which will readily purify heated air entering the rooms of buildings and, through the utilization of the particular filtering element and associated retaining adjuncts thereto, a high degree of purification is maintained at a minimum cost.

Having thus described my invention, what I claim and desire to protect by Letters Patent is:

1. A device of the class described comprising a casing having an inlet opening in its bottom and an outlet opening in one side thereof, a baffle adjustably arranged in the casing and adapted in one position to close the inlet opening and in another position to direct the air from the inlet opening toward the outlet opening, a curved baffle plate extending over portions of the top and the rear wall of the casing for deflecting air through the outlet opening, a filtering medium suspended from the top of the casing and spaced from the outlet opening with its lower end terminating short of the bottom of the casing and a pan at the bottom of the casing and arranged under the filtering medium for receiving particles of foreign matter therefrom.

2. A device of the class described comprising a casing having an inlet opening in its bottom and an outlet opening in one side thereof, a baffle adjustably arranged in the casing and adapted in one position to close the inlet opening and in another position to direct the air from the inlet opening toward the outlet opening, a curved baffle plate extending over portions of the top and the rear wall of the casing for deflecting air through the outlet opening, a filtering medium suspended from the top of the casing and spaced from the outlet opening with its lower end terminating short of the bottom of the casing, a pan at the bottom of the casing and arranged under the filtering medium for receiving particles of foreign matter therefrom and said casing having an air inlet passage extending through the wall in which the outlet opening is arranged and communicating with the interior of the casing, said opening passing under the pan.

In testimony whereof I affix my signature.

EARL W. LITTLE.